July 12, 1949.   F. H. LE JEUNE   2,476,151
METHOD OF MAKING BRAKE DRUMS
Filed June 16, 1943
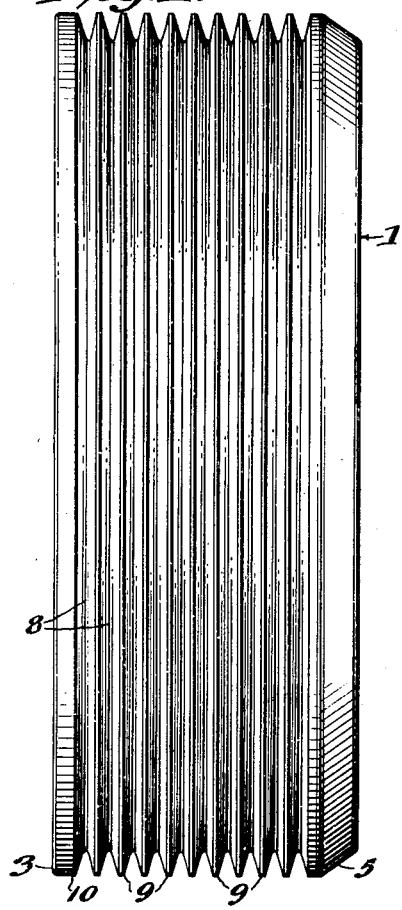
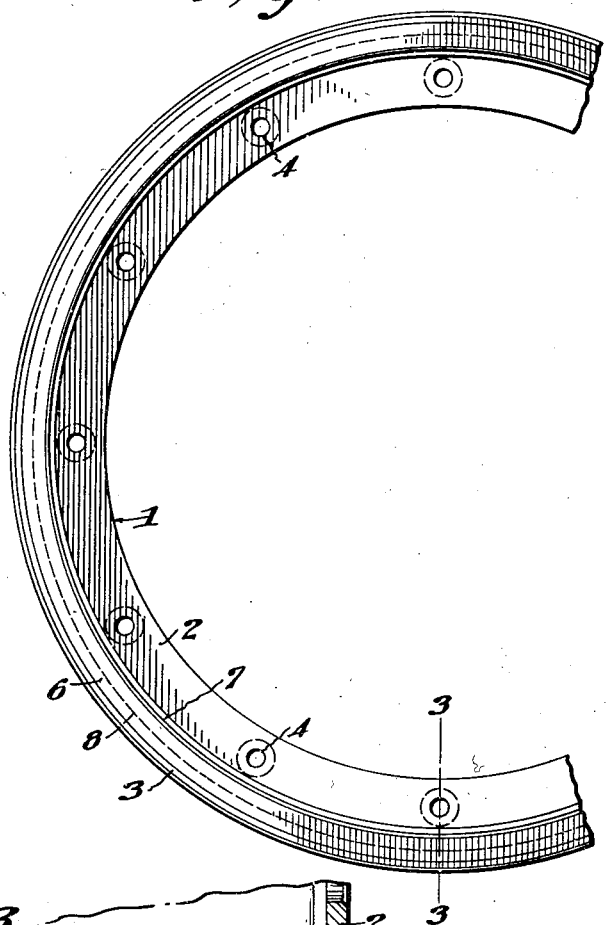
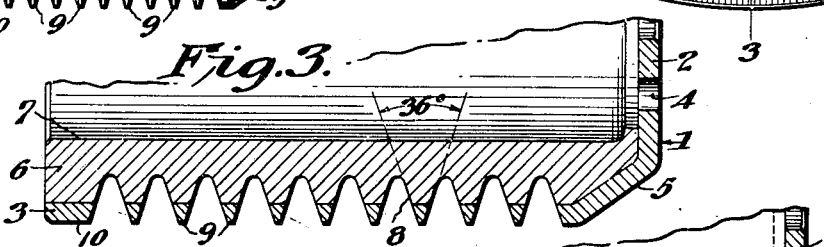
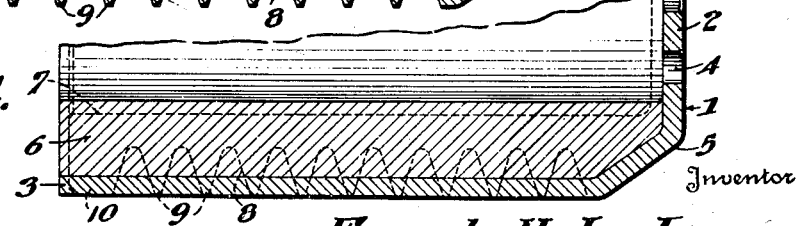
Inventor
Frank H. LeJeune
By Beaman + Langford
Attorneys Patented July 12, 1949

2,476,151

UNITED STATES PATENT OFFICE 2,476,151

METHOD OF MAKING BRAKE DRUMS

Frank H. Le Jeune, Jackson, Mich., assignor, by mesne assignments, to The B. F. Goodrich Company, Akron, Ohio, a corporation of New York Application June 16, 1943, Serial No. 491,000

4 Claims. (Cl. 29—152.2)

This invention relates to improvements in reinforced brake drums and the method of making the same, and particularly to composite brake drums for use with motor vehicle wheels, airplane wheels, and the like.

An object of this invention is to provide an improved construction of brake drum having a sheet metal body and an annular cast metal brake engaging portion reinforced by a plurality of peripherally extending continuous bands.

Another object is to so construct the parts that an integral bond is accomplished between the bands and the cast metal brake engaging portion.

A further purpose is to so construct the composite and reinforced brake drums that the annular reinforcing bands serve as heat radiating or dissipating ribs in heat exchange relation with respect to the cast metal brake engaging member, and at the same time portions of this cast annular brake engaging member are exposed for direct heat radiation or dissipation.

Still another object is to provide a method of making reinforced composite brake drums by which the parts are brought together in substantially integral bonding, and are then machined to provide the heat dissipating ribs with the continuous annular reinforcing bands bonded to the cast metal portion so that they will not come off and so that they will serve to reinforce and strengthen the cast metal portion.

With the above and other objects in view, some of which will be apparent to those skilled in the art, and others of which are inherent in the construction and use of the invention and in the carrying out of the method, this invention includes certain novel features of construction and combinations and arrangements of parts and certain steps and procedures and operations in the production method or process, which will be hereinafter set forth in connection with the drawings and then pointed out in the claims.

In the drawings:

Figure 1 is a view in elevation showing an adaptation of this invention resulting from the practice of the method.

Fig. 2 is an elevational view taken substantially at right angles to the showing in Figure 1 and looking into the open end of the brake drum.

Fig. 3 is an enlarged fragmentary sectional view taken substantially on line 3—3 of Fig. 2.

Fig. 4 is a view similar to Fig. 3 illustrating the parts in an intermediate stage before completion.

The body portion, generally indicated at 1, is made up of sheet metal stamped or drawn or otherwise shaped to provide a web 2 and an annular flange 3. This body portion 1 can be made up of sheet steel, and in the presently illustrated embodiment I have disclosed the web 2 as made relatively narrow and as provided with a plurality of spaced fastening receiving openings 4, the annular flange 3 being shaped somewhat after the manner of an inclined shoulder, as at 5, at its point of juncture with the web 2.

An annular lining and brake engaging portion 6 is cast within or into the annular flange 3, substantially after the manner shown in Fig. 4, and it has been found in practice that the cast iron can be centrifugally cast, or can be poured in a sand or other mold, to form this annular lining 6, and that by regulating the heat and the relative temperatures, the lining 6 will be integrally bonded or molecularly bonded to the flange 3. With the lining cast in place within the sheet metal body portion, the cast lining, due to its integral bonding, will be held against rotational movement or separation from the sheet metal body, and the parts are then ready for machining. The inner cast face of the cast liner 6 is machined to provide a smooth brake engaging face 7, and this brake engaging face can be dimensioned and contoured and finished to suit particular requirements.

Through additional and further machining operations, an axially spaced series of grooves is cut in the outer surface of the brake drum assembly, as indicated at 8. These grooves are cut or formed peripherally and are preferably so spaced that a plurality of endless reinforcing bands or rings 9 are left intermediate the grooves, with a relatively wider reinforcing band 10 left around the mouth or open end of the cast brake lining 6. In the present instance, the grooves are shown as tapered to leave correspondingly tapered ribs intermediate, and it has been found that satisfactory results are obtained where the wedge-shaped forms thus resulting equal substantially 36 degrees, although it will of course be appreciated that this angle is only relative and may be varied to suit different conditions and requirements of use.

The grooves 8, as machined peripherally through the annular flange 3 are extended inwardly to expose and perhaps cut into the outer material of the cast lining 6, and the ring portions 9 and 10 are thus left as integrally bonded steel bands encircling and bonded to the cast iron lining so that they will not come off. At the same time, the formation of the grooves 8 increases the heat exchange surface and the portions 9 and 10 extend substantially as heat dissipating or heat exchange ribs around the completed brake drum.

The method of forming or making the reinforced composite brake drum of my invention is accomplished by forming the body of sheet metal or sheet steel with a connecting web and an annular flange, next integrally bonding the cast lining of cast iron within the annular flange, and then machining through the annular outer flange and forming an axially spaced series of grooves exposing the outer surface of the cast inner brake engaging lining and with the intermediate portions of the outer annular flange disposed as endless reinforcing bands outstanding as heat exchange or heat dissipating ribs.

The above discloses an adaptation of this invention which has been found satisfactory; but, obviously the structure can be embodied in other forms and shapes and styles of brake drums, and the method can be carried out in various suitable manners.

Thus, while I have herein shown and described only certain specific embodiments and have set forth only certain possible modifications, it will be appreciated that many changes and variations can be made in the form and construction and arrangement and association of the parts and in the steps of carrying out the method, without departing from the spirit and scope of this invention.

I claim:

1. The method of making reinforced brake drums consisting of shaping a sheet metal body to provide an annuar flange, casting an annular brake engaging portion within said annular flange, and machining the annular portions on the outer side to provide peripheral grooves extending through the sheet metal annular flange and exposing portions of the cast brake engaging portion.

2. The method of making reinforced brake drums consisting of shaping a sheet steel body to provide a web and an annular flange, casting and bonding a cast iron annular brake engaging portion integrally into said annular flange, and machining an axially spaced series of grooves around the annular portions to provide spaced peripheral grooves extending through the sheet steel annular flange and into the cast iron brake engaging portion, thereby providing a plurality of spaced and integrally bonded continuous peripherally extending reinforcing bands outstanding as heat exchange ribs.

3. The method of making a reinforced composite brake drum comprising forming a body of sheet metal with an annular flange and a connecting web, integrally bonding a lining of different material within the annular flange, and then machining through the outer annular flange and forming an axially spaced series of grooves extending into the outer surface of the inner brake engaging portion with the intermediate portions of said outer annular flange disposed as endless reinforcing bands outstanding as heat dissipating ribs.

4. The method of making a reinforced composite brake drum comprising forming a body of sheet steel having an annular flange and a connecting web, integrally bonding a brake engaging lining of cast iron within the annular flange, and then machining through the outer annular sheet steel flange and forming an axially spaced series of grooves exposing the outer portion of the inner cast iron brake engaging lining portion with the intermediate portions of said outer annular flange disposed as endless annular reinforcing bands outstanding as heat dissipating ribs.

FRANK H. LE JEUNE.

REFERENCES CITED

The following references are of record in the file of this patent:

UNITED STATES PATENTS

| Number | Name | Date |
|---|---|---|
| 1,874,363 | Sampson | Aug. 30, 1932 |
| 2,016,435 | Isidin | Oct. 8, 1935 |
| 2,035,142 | Campbell | Mar. 24, 1936 |
| 2,080,895 | Nelson | May 18, 1937 |
| 2,081,605 | Sinclair | May 25, 1937 |
| 2,109,110 | Frank | Feb. 22, 1938 |
| 2,112,697 | Van Halteren | Mar. 29, 1938 |
| 2,143,445 | Le Jeune | Jan. 10, 1939 |
| 2,161,904 | Sinclair | June 13, 1939 |
| 2,173,591 | Miller et al. | Sept. 19, 1939 |